United States Patent Office 3,225,097
Patented Dec. 21, 1965

3,225,097
METHOD OF PREPARING POLY(GAMMA-AMINOPROPYL)INDENE
Hans Dressler, Pitcairn, Pa., assignor to Koppers Company, Inc., a corporation of Delaware
No Drawing. Filed May 28, 1962, Ser. No. 197,929
3 Claims. (Cl. 260—570.8)

This invention relates to poly(gamma-aminopropyl) indene, a mixture of di- and tri(gamma-aminopropyl)

(I)

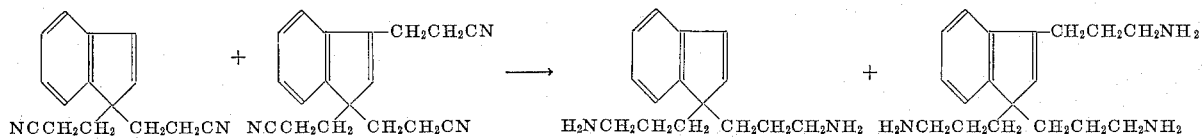

indenes having many useful properties, including remarkable nematocidal effectiveness. In one specific aspect, it relates to the catalytic reduction of poly(betacyanoethyl) indene to produce in high yields, poly(gamma-aminopropyl)indene.

The reaction of indene with acrylonitrile, discovered by Herman A. Bruson, and described in U.S. Patent 2,280,-058, provides a mixture comprising a major proportion (ca. 75%) of tricyanoethyl indene and a minor proportion (ca. 25%) of dicyanoethyl indene, the mixture being conventionally referred to in the art as poly(beta-cyanoethyl)indene. In the co-pending application of Hans Dressler et al., S.N. 197,878, filed April 28, 1962, now U.S. Patent 3,179,693, there is disclosed and claimed a novel method of making poly(beta-cyanoethyl)indene by the selective cyanoethylation of crude coal tar distillates, such as Solvent Naphtha. I have discovered a novel process which unexpectedly converts poly(beta-cyanoethyl)indene to poly(gamma-aminopropyl)indene, a novel and remarkably potent nematocide.

The reduction of the nitrile group of a cyanoalkyl radical attached to an aromatic hydrocarbon nucleus is not new. However, the selective reduction of a cyanoalkyl-substituted indene has not been heretofore accomplished. According to E. H. Rodd in the "Chemistry of Carbon Compounds," vol. III, p. 1253, Elsevier Publishing Co. (Amsterdam, 1956), indene and its substituted derivatives are readily reduced at the 2,3-double bond on contact with hydrogen in the presence of a catalyst. Nickel catalysts are known to be particularly effective in the hydrogenaiton of the 2,3-double bond of indene. K. Alder and O. Wolff, Ann., 576, 182 (1952), hydrogenated indene at room temperature with Raney nickel as the catalyst at 1500 p.s.i.g. to obtain a 90% yield of indane. W. M. Kutz, J. E. Nickels, J. J. McGovern and B. B. Corson, J. Am. Chem. Soc., 70, 4026 (1948), hydrogenated indene at 100° C. and 1000 p.s.i.g. using a 10% nickel catalyst to obtain an 87% yield of indane.

Surprisingly, I have discovered that poly(beta-cyanoethyl)indene, under carefully controlled conditions, can be treated with hydrogen to reduce the nitrile groups to amino groups without affecting the indene 2,3-double bond. The novel product resulting from the use of my new method, poly(gamma-aminopropyl)indene, has a nematocidal effectiveness ten times greater than sodium N-methyldithiocarbamate, the current commercial standard sold under the trademark Vapam.

It is, therefore, an object of the present invention to provide a new chemical compound, poly(gamma-aminopropyl)indene, which, inter alia, is remarkably effective as a nematocide. It is a further object of the invention to provide a process for the selective catalytic hydrogenation of poly(beta-cyanoethyl)indene.

In accordance with the invention, poly(gamma-aminopropyl)indene is made by contacting poly(beta-cyanoethyl)indene with hydrogen in an inert organic solvent in the presence of 3–5 moles of ammonia per mole of poly-(beta-cyanoethyl)indene and a nickel catalyst, supported on an inert carrier and promoted by an alkali metal hydroxide, at an elevated temperature of at least 150° C. under a total pressure of at least 750 p.s.i.g. The overall reaction is shown below in Equation I.

As noted hereabove the poly(beta-cyanoethyl)indene useful as a starting material in the method of the invention is a mixture of a major portion (70–80%) of tri-(beta-cyanoethyl)indene and a minor portion (20–30%) of di(beta-cyanoethyl)indene. This mixture is conveniently made either by the cyanoethylation of pure indene as described by Bruson in U.S. 2,280,058, or by the novel selective cyanoethylation of crude coal tar distillates, such as Solvent Naphtha, described and claimed in the copending application of Hans Dressler et al., S.N. 197,878, filed April 28, 1962, now U.S. Patent 3,179,693.

Hydrogenation is accomplished in an organic solvent that is inert to the product and reactants. Suitable solvents include the aromatic hydrocarbons, such as benzene, toluene, xylene; amines, such as piperidine; and ethers, such as dioxane.

The novel hydrogenation process is conducted in the presence of 3–5 moles of ammonia per mole of poly (beta-cyanoethyl)indene. The presence of ammonia is essential to prevent side reactions such as the formation of secondary and tertiary amines during the reaction. If less than three moles of ammonia per mole of polycyanoethylated indene is used, there is some danger of forming the undesirable secondary and tertiary amines. The presence of more than five moles of ammonia is definitely harmful, since it retards the reaction and only low yields of the desired product are obtained.

The nickel catalyst suitable for the invention is metallic (reduced) nickel supported on an inert carrier, such as kieselguhr, fuller's earth, kaolin, activated carbon, silica gel, alumina, and silica-alumina. Such catalysts contain about 10–70% nickel based on the total weight of the composition. A catalytically effective amount of nickel ranges between about 1–30% nickel based on the weight of the polycyanoethylated indene.

The reaction proceeds effectively only when the catalyst is promoted with an alkali metal hydroxide. Conveniently, the alkali metal hydroxide is added to the reaction mixture either dissolved in or along with a lower dilute alkanol, such as aqueous methanol or ethanol. The presence of the lower alkanol serves to solubilize the alkali metal hydroxide and make it effective in promoting the activity of the nickel catalyst. The alkali metal hydroxide should be present in an amount of 1–10% by weight, based upon the amount of nickel present.

The temperature of the reaction is maintained between about 150–250° C. Below about 150° C. the reaction time is unduly prolonged. Above about 250° C. decomposition becomes noticeable, there is some danger of hydrogenating the indene 2,3-double bond, and, as a result, only low yields of the desired product, poly(gamma-aminopropyl)indene, are obtained.

The total pressure of the system varies with the temperature used for the reaction. The total pressure, which includes the autogenous pressure resulting from maintaining the system at the desired temperature level and the partial hydrogen pressure under which the system is placed, should be at least about 750 p.s.i.g. and can be conveniently varied between 750 and 2500 p.s.i.g. No particular advantage is seen in using higher pressures. The hydrogen pressure applied to the system ranges preferably between 300 and 750 p.s.i.g. It should be at least 200 p.s.i.g. and no advantage is obtained in using pressures higher than 1000 p.s.i.g.

The reaction time is that required for the absorption of the theoretical quantity of hydrogen; i.e. 2.09 moles of hydrogen per 100 grams of poly(beta-cyanoethyl)indene. Generally, this takes place in about 2 to 6 hours. Because of the high degree of selectivity of the process, hydrogen absorption virtually stops after the poly(beta-cyanoethyl)indene is converted to the poly(gamma-aminopropyl)indene. Hydrogen absorption can be measured by the pressure drop within the reactor. The reactor can be intermittently repressured with hydrogen to maintain the required hydrogen pressure until the pressure of the system remains substantially constant or the hydrogenation can be carried out at constant pressure.

After the reaction is complete, the reaction mixture is allowed to cool and is thereafter filtered. The filter cake is washed using an inert organic solvent, including aromatics, such as benzene, toluene, xylene; higher boiling ketones; ethers, amines; and the like. Preferably, the solvent used for washing should be that used as the reaction medium. The product is recovered from the combined filtrate and washings by conventional methods, preferably by devolatilization to 100–180° C. at 5–25 mm. of Hg.

The product poly(gamma-aminopropyl)indene is useful as such or it can be separated into its components, 1,1-bis(gamma-aminopropyl)indene and 1,1,3-tris(gamma-aminopropyl)indene by conventional methods, such as vacuum distillation at low pressures.

The poly(gamma-aminopropyl)indene mixture and its components, the diamine and triamine, have many useful properties. They have excellent solubility in all common organic solvents, except aliphatic hydrocarbons, and are easily soluble in water. They are useful intermediates in the formation of novel polyamides, bacteriocides, rubber chemicals, pharmaceuticals, and anti-static agents for textile conditioning. As noted hereabove, the mixed poly(gamma-aminopropyl)indene has outstanding nematocidal properties. Nematodes are killed by applying to the nematodes in their natural habitat a nematocidal quantity of the poly(gamma-aminopropyl)indene. In the examples that follow it is also shown that poly(gamma-aminopropyl)indene is an effective curing agent for epoxy resins.

My invention is further illustrated by the following examples:

EXAMPLE I

To a stirred mixture of 357 grams (3.0 moles) of 97% indene, 450 ml. of benzene, and 6.0 grams (0.054 mole) of potassium t-butoxide there was added 477 grams (9.0 moles) of acrylonitrile dropwise at 50–60° C. during three hours. The mix was stirred at 50–60° C. for an additional two hours, then treated with 3.0 ml. of glacial acetic acid and 30 grams of activated carbon and filtered. The filtrate was devolatilized to 155° C. (pot)/20 mm. to give 790 grams of poly(beta-cyanoethyl)indene (Found: 14.3% N), an amber semi-solid.

A one-gallon stainless steel stirring-type autoclave was charged with 532 grams of the above poly(beta-cyanoethyl)indene, 500 ml. of benzene, 25 ml. of water, 25 ml. of methanol, 1.0 gram of sodium hydroxide, 50 grams of nickel-on-kieselguhr containing 55% by weight nickel, heated to 170° C., and pressured to 1000 p.s.i.g. with hydrogen. Whenever the pressure fell to about 800 p.s.i.g., the autoclave was repressured with hydrogen to 1000 p.s.i.g., until no further pressure drop was noted after four hours. The autoclave was cooled, vented and the product filtered. The cake was washed with a little benzene. The combined filtrates were devolatilized to 160° C. (pot)/10 mm. to give 490 grams of poly(gamma-aminopropyl)indene, an amber oil having a neutralization equivalent of 112. The structure of the mixed hydrogenation product was elucidated by nuclear magnetic resonance spectroscopy. The results showed that there was no hydrogenation of the indene 2,3-double bond.

EXAMPLE II

A one-gallon, stirring-type, stainless steel autoclave was charged with 532 grams of poly(beta-cyanoethyl)indene (made from a 67% indene fraction obtained by distillation of a commercially available Solvent Naphtha), a nickel-on-kieselguhr catalyst containing 55% by weight nickel, a solution of 1.0 gram of sodium hydroxide in 25 ml. of water plus 25 ml. of methanol, and 500 ml. of benzene. The autoclave was sealed and the stirrer was started. The autoclave was purged with hydrogen, charged with 142 grams of ammonia, pressured to 500 p.s.i.g. with hydrogen, and heated to 175° C. At this temperature the autoclave was pressured to 1000 p.s.i.g. with hydrogen whenever the total pressure fell to 850 p.s.i.g. After 2.5 hours, no further hydrogen uptake was noticed. The mixture was stirred for an additional three hours at 175° C. and 1000 p.s.i.g. total pressure. The autoclave was then cooled and vented. The charge was filtered. The catalyst was washed with two 100 ml. portions of methanol and stored wet for possible reuse. The combined filtrate was devolatilized to 180° C./20 mm. to give 520 grams (93.9% yield) of poly(gamma-aminopropyl)indene as a dark amber, viscous residue. Found: neutral equiv. 108.

EXAMPLE III

Poly(gamma-aminopropyl)idene was distilled through a four-inch Vigreux column. The results of the distillation are shown in Table I.

*Table I*

DISTILLATION OF 1,1-BIS AND 1,1,3-TRIS(AMINOPROPYL)-INDENE (4-IN. VIGREUX COLUMN)

| Fraction | G. | B.P. °C. /mm. | Neut. Equiv. | Remarks |
|---|---|---|---|---|
| 1 | 11.7 | 92–143/1 | 157.2 | Possibly traces of monoamine. |
| 2 | 76.3 | 143–153/1 | a116.6 | Pale yellow oil: dipropylamine. |
| 3 | 64.1 | 153–220/2 | | Light brown oil: tripropylamine. |
| 4 | 348.5 | 220–232/2 | b97.2 | |
| Residue | 128.0 | 232/2 | | Glassy, brown; decomposition. | a Calcd. for 1,1-bis(aminopropyl)indene, neut. equiv. 115.0.
b Calcd. for 1,1,3-tris(aminopropyl)indene, neut. equiv. 95.7.

There was thus obtained an 11% yield of 1,1-bis(aminopropyl)indene (Fraction 2) and a 50% yield of 1,1,3-tris(aminopropyl)indene (Fraction 3) of good purity. The retention of the 2,3-double bond of indene in these products was substantiated by nuclear magnetic resonance spectroscopy.

EXAMPLE IV

The nematocidal efficacy of poly(gamma-aminopropyl)indene was tested by an "in vitro" (contact and vapor phase) method using the nematode *Panagrellus redivivus*, as the test organism. The test data are shown in Table II.

Table II
POLY(GAMMA-AMINOPROPYL)INDENE

| Test | P.p.m. | Percent Nematodes Living After—Hours | | | Test | ED$_{50}$ (P.p.m.) | | |
|---|---|---|---|---|---|---|---|---|
| | | 24 | 48 | 72 | | 24 | 48 | 72 |
| A | 0.1 | 100 | 100 | 100 | A | 0.75 | 0.34 | 0.35 |
| A | 1 | 33 | 5.5 | 8.0 | | | | |
| A | 10 | 0 | 0 | 0 | | | | |
| B | 10 | 0 | 0 | 0 | | | | |

VAPAM—SODIUM N-DIMETHYLDITHIOCARBAMATE

| Test | P.p.m. | 24 | 48 | 72 | Test | 24 | 48 | 72 |
|---|---|---|---|---|---|---|---|---|
| A | 1 | 100 | 100 | 100 | A | 4 | 3.5 | 3.2 |
| A | 10 | 1 | 0.5 | 0 | B | 3.2 | 3.2 | 3.2 |
| A | 100 | 0 | 0 | 0 | C | 3.2 | 3.2 | 3.2 |
| B | 1 | 100 | 100 | 100 | D | 4 | 3.2 | 3.2 |
| B | 10 | 0 | 0 | 0 | E | 4.2 | 3.8 | 3.2 |
| C | 1 | 100 | 100 | 100 | | | | |
| C | 10 | 0 | 0 | 0 | Av | 3.7 | 3.4 | 3.2 |
| D | 1 | 100 | 100 | 100 | | | | |
| D | 10 | 7 | 0 | 0 | | | | |
| E | 1 | 100 | 100 | 100 | | | | |
| E | 10 | 9 | 2.5 | 0 | | | | |

The results show that the poly(gamma-aminopropyl)indene mixture has a nematocidal effectiveness (effective dose in p.p.m. to give 50% kill in hrs.) of ED$_{50}$=0.75 (24 hrs.) and ED$_{50}$=0.34 (48 hrs). This compares with ED$_{50}$=3.7 (24 hrs.), ED$_{50}$=3.4 (48 hrs.) for Vapam (sodium N-methyldithiocarbamate) which is the current standard commercial nematocide. It has been further found that the poly(gamma-aminopropyl)indene has fungicidal properties and is noninjurious to plants.

EXAMPLE V

The novel poly(gamma-aminopropyl)indene was tested for its effectiveness as an epoxy curing agent. Samples of the commercially available diglycidyl ether derivative of Bisphenol A, designated as Epon 828, were cured with an equivalent amount (based on the active hydrogen atoms) of poly(gamma-aminopropyl)indene and an equivalent amount of diethylene triamine, a conventional curing agent for epoxides. The test samples were used to bond aluminum strips. The bondings were measured as tensile shear strength in p.s.i. using different curing times and temperatures. The results are shown in Table III.

Table III

| Curing Conditions | Tensile Shear Strength, p.s.i. | | |
|---|---|---|---|
| | 25° C.— 24 hours | 25° C.— 7 days | 150° C.— 2 hours |
| Epon 828/Diethylene Triamine | 760 | 770 (810) | 2,190 |
| Epon 828/Poly(gamma-aminopropyl)indene | 970 | 1,096 | 1,700 |

The results show that the aluminum:aluminum bond strength of Epon 828 cured with the novel poly(gamma-aminopropyl)indene at room temperature is better than the bond strength obtained with diethylene triamine.

I claim:
1. Method of making mixed 1,1-bis(aminopropyl)indene and 1,1,3-tris(aminopropyl)indene comprising contacting poly(beta-cyanoethyl)indene with hydrogen in an inert organic solvent in the presence of 3–5 moles of ammonia per mole of poly(beta-cyanoethyl)indene, and a nickel catalyst, supported on an inert carrier, consisting essentially of 10–70% by weight nickel and promoted by an alkali metal hydroxide, at a temperature of 150–250° C. and under a total pressure of 750–2500 p.s.i.g.

2. Method of making mixed 1,1-bis-(aminopropyl)indene and 1,1,3-tris(aminopropyl)indene comprising contacting poly(beta-cyanoethyl)indene with hydrogen in benzene in the presence of 3–5 moles of ammonia per mole of poly(beta-cyanoethyl)indene, and a nickel catalyst supported on kieselguhr in an amount of about 1–30% by weight metallic nickel based on the poly(beta-cyanoethyl)indene and promoted by 1 to 10% by weight of alcoholic sodium hydroxide, at a temperature of 150–250° C. and under a total pressure of 750–2500 p.s.i.g.

3. Method of making mixed 1,1-bis(aminopropyl)indene and 1,1,3-tris(aminopropyl)indene comprising contacting poly(beta-cyanoethyl)indene with hydrogen in benzene in the presence of 3–5 moles of ammonia per mole of poly(beta-cyanoethyl)indene, and a nickel catalyst supported on kieselguhr in an amount of about 1–30% by weight metallic nickel based on the poly(beta-cyanoethyl)indene and promoted by 1–10% by weight of alcoholic sodium hydroxide, at a temperature of 150–250° C. and under a hydrogen partial pressure of 200–1000 p.s.i.g.

References Cited by the Examiner
UNITED STATES PATENTS

| | | | |
|---|---|---|---|
| 2,280,058 | 4/1942 | Bruson | 260—465 |
| 2,320,029 | 5/1943 | Bruson | 260—570.8 |
| 2,365,936 | 12/1944 | Bruson | 167—30 |
| 2,884,456 | 4/1959 | Campbell | 260—570.8 |
| 2,938,053 | 5/1960 | Blake et al. | 260—561 |
| 2,953,490 | 9/1960 | Deebel | 167—30 |
| 2,957,800 | 10/1960 | Hopkins et al. | 167—30 |
| 3,002,997 | 10/1961 | Green et al. | 260—570.5 |
| 3,054,822 | 9/1962 | Schorr et al. | 260—471 |
| 3,062,869 | 11/1962 | Gould | 260—561 X |
| 3,085,930 | 4/1963 | Graunholtz et al. | 167—30 |

CHARLES B. PARKER, *Primary Examiner*.

IRVING MARCUS, *Examiner*.

ROBERT V. HINES, *Assistant Examiner*.